Oct. 2, 1962  B. L. MIMS  3,056,636
PRELOADED BEARING AND METHOD OF MAKING SAME
Filed March 21, 1961  2 Sheets-Sheet 1
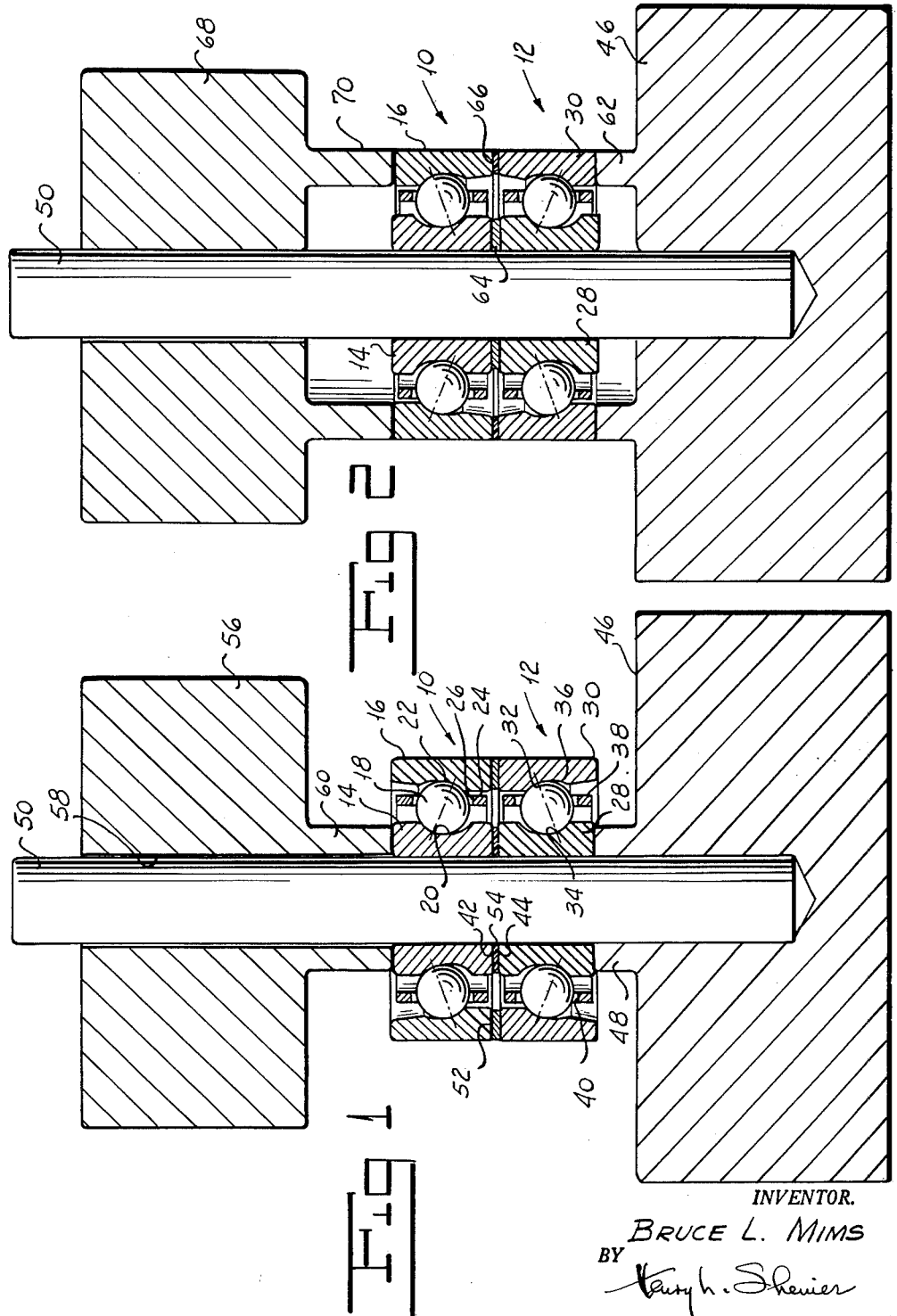
INVENTOR.
BRUCE L. MIMS
BY
ATTORNEY Oct. 2, 1962  B. L. MIMS  3,056,636
PRELOADED BEARING AND METHOD OF MAKING SAME
Filed March 21, 1961  2 Sheets-Sheet 2
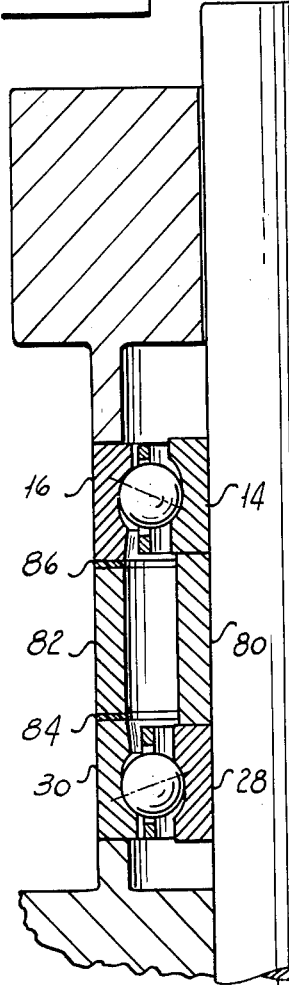
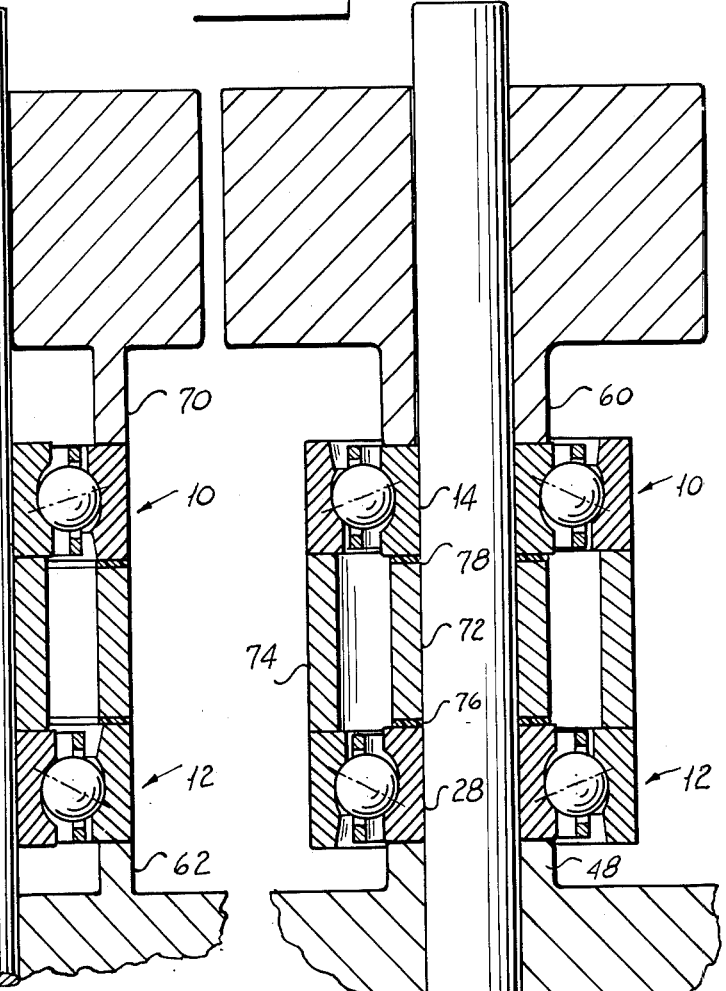
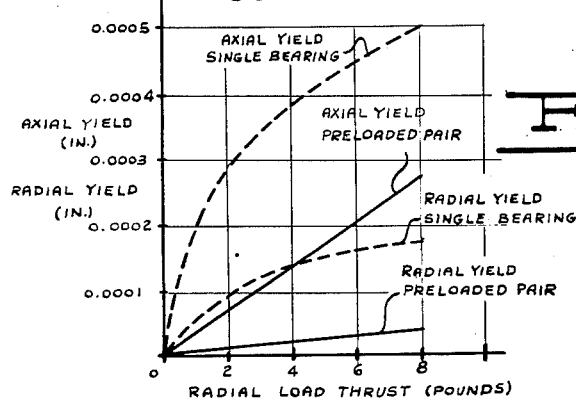
INVENTOR.
BRUCE L. MIMS
BY Henry L. Skenier
ATTORNEY

United States Patent Office 3,056,636
Patented Oct. 2, 1962

3,056,636
PRELOADED BEARING AND METHOD OF MAKING SAME
Bruce L. Mims, Danbury, Conn., assignor to The Barden Corporation, Danbury, Conn., a corporation of Connecticut
Filed Mar. 21, 1961, Ser. No. 97,358
8 Claims. (Cl. 308—196)

My invention relates to a method of preloading bearings and more particularly to an improved method of manufacturing preloaded bearings which overcomes defects of methods of the prior art.

In the design of precision instruments the exact radial and axial position of a rotating element and the maintenance of that position under external loads are prime objectives. While requirements for various bearing applications differ widely, all applications have in common a need for bearings which provide rotational accuracy, precise positioning and rigidity. Once a bearing has been produced with the greatest possible rotational accuracy, there must next be considered the part played by the bearings in precisely positioning and in imparting rigidity to the rotating element. The first factor which must be taken into account in achieving precise positioning and rigidity is radial and axial play inherent in the bearing.

It has been discovered that complete elimination of radial clearance is neither feasible during manufacture nor is it desirable in use of a bearing. Bearings with no initial radial play not only have low thrust load capacity and poor axial rigidity but are sensitive to expansion resulting from internal friction and from thermal differentials between shafts and housings.

On the other hand, in mounting a bearing elimination of axial clearance by the use of external means is both feasible and desirable. Axial takeup has the further advantage that it effectively removes radial clearance by establishing contact of all balls with both raceways. Various means have been suggested in the prior art for eliminating axial clearance. Any means by which at least two bearings can be axially offset in an amount which removes the internal clearance successfully accomplishes the result. For example, springs or shims may be employed. Removal of axial and radial clearance provides only minimum rigidity. Any increased rigidity which is required for heavier operating loads must be obtained by other means. In bearing applications such as for a gyro rotor, increased rigidity is required to ensure that the precise positioning will be maintained under external loads or other disturbing influences. That is, in an installation of this type there is introduced into the mounting such a thrust load as will reduce subsequent bearing yield to a point at which it permits that total radial or axial movement of the unit which can be tolerated. It can be demonstrated that from a point of zero load at which only sufficient axial takeup has been applied to remove initial internal clearance from the bearing with the imposition of external thrust or radial loads the compliance or rate of yield, both axially and radially, is highest under initial load increments. This is due primarily to the development of larger and larger contact areas between balls and raceways as the load is increased.

It has been suggested in the prior art that bearings be loaded by a specific amount to take advantage of the characteristic outlined above so that as the initial high deflection rates are eliminated by preloading further yield under applied loads is reduced.

Under a specific preload it can be shown that the axial yield rate of the pair is one half that of a single bearing under a thrust load axial to the specified preload. Not only is the yield of preloaded pairs lower but the yield rate is essentially linear.

Preloading of pairs of bearings to achieve an assembly having the desirable characteristic outlined above may be accomplished by any opposed mounting of two bearings whether they be actually in contact or be separated by spacers or rigid precision parts. As a practical matter, application of a precision preload is a highly critical operation. Slight dimensional errors in inner or outer ring offsets can appreciably affect the resulting preload. Thus, extremely precise spacers or mating parts are required. Not only is this true but also extreme cleanliness and great care in mounting on the part of the user of the bearing must be exercised since minute foreign particles may prevent accurate seating and cause errors in preload.

In accordance with the method of the prior art of producing preloaded pairs, each bearing is precisely ground to produce a predetermined offset between the inner and outer ring faces under no load axial takeup. For example, where a back-to-back pair is being manufactured one face of each inner ring is ground to provide a predetermined offset between that face and the corresponding outer ring face. When this has been done, the pair is mounted with the thrust load applied to the inner ring faces which have not been ground. The assembly may be clamped together with the ground inner ring faces in contact to provide a precisely determined internal axial preload. The same result may be achieved by spacing the two bearings by two spacers accurately manufactured to equal length and correctly mounted. It will be appreciated that the operation of manufacturing the spacers itself is a precision operation.

As an alternate to the method outlined above, a thrust load can be applied to a single bearing and it may be frozen in the loaded position by filling it with material which will solidify. When this has been done, the offset faces can be ground flush and the filler material removed. Alternatively the offset faces can be ground while the bearing is spring-loaded in a capsule.

All of the methods outlined above require precision grinding operations. In some instances precision measurements are necessary. In other cases disassembly and reassembly of the bearing are required. In all cases extremely careful cleaning of the bearing after the preloading operation is required and great care must be exercised in installing the bearing.

I have invented a method of preloading bearings which overcomes the defects of preloading methods of the prior art. My method requires no precision grinding operation. It may be achieved without extensive precision measurements and without disassembly of the bearing. My method does not require the extreme cleanliness which is necessary in assembling preloaded bearings of the prior art. My method is simpler and less expensive to perform than are methods of the prior art. By practicing my method I produce a simplified preloaded bearing pair.

One object of my invention is to provide a method of preloading bearings which overcomes the disadvantages of methods of the prior art.

A further object of my invention is to provide a method of preloading bearings which requires no precision grinding operations.

Another object of my invention is to provide a method of preloading bearings which is simpler and less expensive than methods of the prior art.

A still further object of my invention is to provide a method of preloading bearings which does not require the extreme cleanliness necessary in practicing methods of the prior art.

Yet another object of my invention is to provide a method of preloading bearings in which disassembly and re-assembly of the bearing are not necessary.

Still another object of my invention is to provide a simplified preloaded bearing.

In general my invention contemplates the provision of an axially preloaded bearing pair in which I first assemble the bearings of the pair on a shaft with a shim or spacer separating corresponding rings of the pair and with means comprising a disk of thermosetting resin separating the other corresponding rings of the pair. I then apply the desired preload to those rings between which the disk of thermosetting material is disposed and place the thus loaded assembly in a curing oven for a length of time sufficient to set the thermosetting resin. When the assembly is then removed from the shaft, it has a predetermined built-in load.

In the accompanying drawings which form part of the instant specification and which are to be read in conjunction therewith and in which like reference numerals are used to indicate like parts in the various views:

FIGURE 1 is a sectional view illustrating a fixture carrying a pair of bearings which are to be preloaded in back-to-back relationship by use of my method of preloading bearings.

FIGURE 2 is a sectional view of a fixture carrying a pair of bearings which are to be preloaded in face-to-face relationship by my method of preloading bearings.

FIGURE 3 is a view illustrating my method of preloading a pair of bearings back-to-back in spaced relationship.

FIGURE 4 is a view illustrating my method of preloading a pair of bearings face-to-face in spaced relationship.

FIGURE 5 is a graph of the relationship between thrust or radial load and axial yield or radial yield for unloaded, low contact angle single bearings and for preloaded pairs.

Referring now to FIGURE 1 of the drawings, I have shown a pair of bearings, indicated generally by the respective reference characters 10 and 12, which are to be loaded back-to-back by my method of preloading bearings. Bearing 10 includes an inner ring 14, an outer ring 16, rolling elements 18 disposed in the respective races 20 and 22 of the rings 14 and 16 and a retainer ring 24 provided with openings 26 for receiving the balls 18.

Bearing 12 has an inner ring 28, an outer ring 30, rolling elements such as balls 32 disposed in the respective races 34 and 36 of the rings 28 and 30 and a retainer ring 38 formed with openings 40 for the reception of the balls 32.

In accordance with the method of the prior art if it be desired to preload a pair of bearings such as the bearings 10 and 12, the respective faces 42 and 44 of the inner rings 14 and 28 would be ground to produce a predetermined offset between these faces and the corresponding faces of the outer rings 16 and 30 under no load axial takeup. Then when the bearing was mounted under a specified thrust load, all the faces would be brought into the same plane and when the inner rings 14 and 28 are clamped a predetermined internal axial preload results as indicated by the load lines shown in dot-dash lines in the figure.

In practice of my method I first assemble the bearing 12 on a fixture having a base 46 formed with a boss 48 on which the inner ring 28 rests. Base 46 carries an aligning shaft 50 on which the inner ring 28 is placed. After having placed the bearing 12 on the shaft with the ring 28 on the boss 48, I position a rigid spacer or shim 52 on the outer ring 30. This shim 52 has such a thickness that it would reduce axial play under no load conditions.

I next place a disk 54 of a suitable thermosetting resin on the inner ring 28. This disk 54 is formed of any thermosetting adhesive having the properties of bonding to steel, low creep, good stability and good tensile and compressive strength. One material which I have found suitable for this purpose is "Scotch-weld" bonding film which is a registered trademark of Minnesota Mining and Manufacturing Co. for an epoxy resin paper. Another material from which the disk 54 can be formed is a condensation product of furfuryl alcohol prepared by heating a 15 to 75% solution of furfuryl in a volatile water-immiscible non-reactive solvent of the class consisting of volatile water-immiscible ketones, carboxylic acid esters and ethers and mixtures thereof in the presence of from 0.01 to 1.0% of boron trifluoride catalyst and separating the water of condensation by azeotropic distillation at a temperature of 75 degrees to 175 degrees C.

Another low pressure thermosetting synthetic resin adhesive composition which I may use comprises a synthetic linear polyamide combined with a compatible phenol formaldehyde resin. The linear polyamide is an alcohol soluble polyamide prepared from diamines and dicarboxylic acid one or both of which contain a hydrocarbon substituent in the chain of atoms separating the amide forming groups. This disk may be formed by punching it out on a suitable die from a sheet of the thermosetting material.

When the disk 54 has thus been assembled on the inner ring 28 of the bearing 12, I then place the bearing 10 on the shaft 50 with its inner ring 14 resting on the disk 54 and with the outer ring 16 resting on the shim 50.

The fixture on which I perform my method includes a member 56 having a bore 58 which permits it to be slipped on to the shaft 50 and a boss 60 which rests on the inner ring 14. The member 56 has a weight which is equal to the load which is to be built into the assembly of bearings 10 and 12.

When all the parts have been assembled on the fixture in the manner described, it is placed in an oven for a sufficient time and at a suitable temperature to cause the thermosetting disk 54 to set firmly to bond the two inner rings 14 and 28 together. The time and temperature are, of course, determined by the particular adhesive used. The dimension of the resultant adhesive layer between the inner rings may be between 0.001 inch and 0.009 inch in a typical case. It will readily be understood that the dimensions of the shim 52 and of the layer of adhesive are determined by the ring width, radial play, curvature and other characteristics of the bearings being assembled into the preloaded pair.

The amount of yield for a given load both for single bearings and for preloaded pairs can readily be determined by reference to FIGURE 5 of the drawings.

Referring now to FIGURE 2 of the drawings, let us consider that we wish to provide a face-to-face preloaded pair from the same two bearings 10 and 12. In this form of my method the fixture base 46 carries the shaft 50 and an annular boss 62 having a diameter such that the outer ring 30 of the bearing 12 rests on the boss when the bearing 12 is placed on the shaft 50. When this has been done, I assemble a rigid shim 64 of a suitable dimension on top of the inner ring 28 of bearing 12. I place a disk 66 of a suitable thermosetting adhesive material such as is described above on the upper face of the ring 30 as viewed in the figure. When the bushing 64 and the disk 66 have been placed in position, I slip the bearing 10 on the shaft 50 so that the inner ring 14 rests on the shim 64 and the outer ring 16 rests on the disk 66. The loading member 68 which I employ in this form of my method has an annular boss 70 adapted to rest on the upper face of the ring 16 to apply the desired preload to the assembly. When all the parts have thus been placed in position, I put the assembly in an oven at a suitable temperature for a sufficient time to set the resin of the disk 66. When the resin has set, the parts of the fixture are disassembled and there results a face-to-face preload pair of bearings 10 and 12.

It will be appreciated that a spring loading means of a suitable type could be substituted for the weight provided by the loading member 56 or 68. It is to be emphasized that the salient feature of the invention is that the thermosetting material permits the faces of the loaded bearing rings to arrive at an equilibrium position under load as the material softens. I have discovered further that the adhesive material which I employ to make the disk 54 or 68 does not stick to the shaft 50 as a result of the curing operation.

Referring now to FIGURE 3 of the drawings, I have illustrated a form of my method in which I assemble the bearings 10 and 12 as a back-to-back preloaded pair in spaced relationship. In this form of my method I employ an inner ring spacer 72 which is shorter than the outer ring spacer 74 so that I need not use shim 52. In carrying out this form of my method I assemble disks 76 and 78 of thermosetting adhesive respectively between one end of the spacer 72 and the ring 28 and between the other end of the spacer 72 and the ring 14. When this assembly is baked to set the adhesive in the manner outlined above, there results a back-to-back preloaded pair mounted in spaced relationship.

Referring now to FIGURE 4, I have shown my method of producing a face-to-face preloaded pair of bearings 10 and 12 mounted in spaced relationship. In this form of my invention I employ an inner ring spacer 80 which is longer than the outer ring spacer 82 and I dispose respective disks 84 and 86 of thermosetting material between one end of the spacer 82 and the ring 30 and between the other end of spacer 82 and ring 16. I place this assembly in a curing oven to set the thermosetting resin of the disks to produce a face-to-face preloaded pair of bearings 10 and 12 mounted in spaced relationship to each other.

In practice of my method of preloading bearings, I assemble the pair of bearings 10 and 12 on the shaft 50 and fixture 46 with a shim of suitable thickness between one pair of corresponding rings of the pair and with a disk of thermosetting material between the other rings of the pair. If I desire to produce a back-to-back preloaded pair of bearings, I dispose the shim 52 between the outer rings 16 and 30 and I place the disk of thermosetting adhesive between the inner rings 14 and 28. If I wish to produce a face-to-face preloaded pair I sandwich the shim 64 between the rings 14 and 28 and I dispose the disk 66 between rings 16 and 30. When the bearings to be preloaded have been placed on the shaft 50, I apply the preload to the rings between which the disk is disposed. When this has been done, I place the assembly in a curing oven at an appropriate temperature for a time sufficient to set the resin. After the resin has set, I remove the assembly from the oven and disassemble the parts of the fixture to permit removal of the preloaded pair.

If I wish to produce a spaced preloaded pair, I employ spacers of different lengths for separating the corresponding rings of the pair and I use two disks of thermosetting material as explained hereinabove in connection with FIGURES 3 and 4.

It will be seen that I have accomplished the objects of my invention. I have provided a method of preloading bearings which does not require precision grinding. My method is simpler and more expeditious than are methods of the prior art. My method does not require the extreme cleanliness which is necessary in the practice of methods in the prior art for producing preloaded bearings.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore, to be understood that my invention is not to be limited to the specific details shown and described.

Having thus described my invention, what I claim is:

1. A method of producing a preloaded bearing pair from a pair of bearings each having an inner ring and an outer ring and rolling elements disposed between said rings including the steps of positioning said bearings adjacent each other in axially aligned relationship, rigidly spacing first corresponding rings of said bearings with a rigid spacer, yieldably spacing the other corresponding rings of said bearings with heat reactive adhesive material, loading the other corresponding bearing rings and subjecting the loaded assembly to heat to set said adhesive to provide said preloaded pair.

2. A method of producing a back-to-back preloaded bearing pair from a pair of bearings each having an inner ring and an outer ring and rolling elements disposed between said rings including the steps of positioning said bearings adjacent each other in axially aligned relationship, rigidly spacing the outer rings of said bearings with a rigid spacer, yieldably spacing the inner rings of said bearings with heat reactive adhesive material, loading the inner rings and subjecting the loaded assembly to heat to set the adhesive to produce said preloaded pair.

3. A method of producing a face-to-face preloaded bearing pair from a pair of bearings each having an inner ring and an outer ring and rolling elements disposed between said rings including the steps of positioning said bearings adjacent each other in axially aligned relationship, rigidly spacing the inner rings of said pair with a rigid spacer, yieldably spacing the outer rings of said bearings with heat reactive adhesive material, loading the outer bearing rings and subjecting the loaded assembly to heat to set said adhesive to produce said preloaded pair.

4. A preloaded bearing pair including in combination a first bearing having an inner ring and an outer ring and rolling elements disposed between the rings, a second bearing having an inner ring and an outer ring and rolling elements disposed between the rings, a rigid spacer disposed between the opposing faces of first corresponding rings of the bearings and a compacted adhesive joining the opposing faces of the other corresponding rings of the bearings to each other under a predetermined tension.

5. A back-to-back preloaded bearing pair including in combination a first bearing having an inner ring and an outer ring and rolling elements disposed between the rings, a second bearing having an inner ring and an outer ring and rolling elements disposed between the rings, a rigid spacer disposed between the opposing faces of said outer rings and a compacted adhesive joining the opposing faces of the inner rings of the bearings to each other under a predetermined tension.

6. A face-to-face preloaded bearing pair including in combination a first bearing having an inner ring and an outer ring and rolling elements disposed between the rings, a second bearing having an inner ring and an outer ring and rolling elements disposed between the rings, a rigid spacer disposed between the opposing faces of said inner rings and a compacted adhesive joining the opposing faces of the outer rings of the bearings to each other under a predetermined tension.

7. A preloaded bearing pair including in combination a first bearing having an inner ring and an outer ring and rolling elements disposed between the rings, a second bearing having an inner ring and an outer ring and rolling elements disposed between the rings, a first rigid spacer disposed between the opposing faces of said inner rings, a second rigid spacer disposed between the opposing faces of said outer rings and a compacted adhesive joining the respective opposing faces of the outer rings to said second rigid spacer under a predetermined tension.

8. A preloaded bearing pair including in combination a first bearing having an inner ring and an outer ring and rolling elements disposed between the rings, a second bearing having an inner ring and an outer ring and rolling elements disposed between the rings, a first rigid spacer disposed between the opposing faces of said outer rings of the bearings, a second rigid spacer disposed between the opposing faces of the inner rings of the bearings and a compacted adhesive joining the respective opposing faces of said inner rings to said second rigid spacer under a predetermined tension.

References Cited in the file of this patent

UNITED STATES PATENTS

| | | |
|---|---|---|
| 1,439,901 | Knowles | Dec. 26, 1922 |
| 1,908,474 | Dewees | May 9, 1933 |
| 2,111,869 | Montgomery | Mar. 22, 1938 |
| 2,943,011 | Rayner | June 28, 1960 |